US008458117B2

(12) United States Patent
Wang et al.

(10) Patent No.: US 8,458,117 B2
(45) Date of Patent: Jun. 4, 2013

(54) SYSTEM AND METHOD FOR DEPENDENCY AND ROOT CAUSE DISCOVERY

(75) Inventors: Haiqin Wang, Sammamish, WA (US); Robert Cranfill, Seattle, WA (US); Jai Joon Choi, Sammamish, WA (US); Changzhou Wang, Bellevue, WA (US); Sidney Ly, Seattle, WA (US); William Ferng, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 787 days.

(21) Appl. No.: 12/364,182

(22) Filed: Feb. 2, 2009

(65) Prior Publication Data

US 2010/0198776 A1     Aug. 5, 2010

(51) Int. Cl.
*G06N 5/00* (2006.01)
(52) U.S. Cl.
USPC ............................................. 706/58; 706/45
(58) Field of Classification Search
USPC ...................................... 706/58, 45
See application file for complete search history.

(56) References Cited

U.S. PATENT DOCUMENTS

| 7,401,728 B2 | 7/2008 | Markham et al. |
| 2009/0204234 A1 | 8/2009 | Sustaeta et al. |
| 2009/0204237 A1 | 8/2009 | Sustaeta et al. |
| 2009/0204245 A1 | 8/2009 | Sustaeta et al. |
| 2009/0204267 A1 | 8/2009 | Sustaeta et al. |
| 2009/0210081 A1 | 8/2009 | Sustaeta et al. |

OTHER PUBLICATIONS

Russell, Learning Instruction Scheduling Heuristics from Optimal Data, Masters Thesis, University of Waterloo, 2006, pp. 1-86.*
Russell, Learning Instruction Scheduling Heuristics from Optimal Data, Master's Thesis, University of Waterloo, 2006, pp. 1-86.*
McGovern, Autonomous Discovery of Temporal Abstractions From Interaction With an Environment, Doctoral Thesis, University of Massachusetts Amherst, Department of Computer Science, May 2002, pp. 1-171.*
Murphy, Dynamic Bayesian Networks: Representation, Inference and Learning, Doctoral Thesis, University of California, Berkeley, 2002, pp. 1-281.*

* cited by examiner

*Primary Examiner* — Wilbert L Starks
(74) *Attorney, Agent, or Firm* — Armstrong Teasdale, LLP

(57) ABSTRACT

The embodiments described herein describe a computerized system and method for retrieving and processing data to provide dependency and root cause information for a process. The computerized system and method include receiving historic data of the process, detecting temporal dependency or precedence tasks in the process from the historic data, generating a historic dependency graph, aggregating the historic dependency graph into a probabilistic precedence network (PPN), pruning the PPN, and presenting results to a user.

12 Claims, 15 Drawing Sheets

SAT Info and Responses: Line=641 CC=121

| SAT | IP | ProblemDesc | ProblemType | Resolution | Response |
|---|---|---|---|---|---|
| 273883 | IP-00D400015W | need a tag on the nos... | NCR Request | Closed | 5/7/2007 12:39:00 PM NCT--M... |
| 273712 | IP-00DM49112W | SOS 271W1402-1P-N... | Parts - SOS | Closed | 5/9/2007 2:41:00 PM $$ PCO--... |
| 273712 | IP-00DM49112W | SOS 271W1402-1P-N... | Parts - SOS | Closed | 5/9/2007 1:00:00 PM PCO--P... |
| 273712 | IP-00DM49112W | SOS 271W1402-1P-N... | Parts - SOS | Closed | 5/9/2007 12:20:00 PM PCO--... |
| 273712 | IP-00DM49112W | SOS 271W1402-1P-N... | Parts - SOS | Closed | 5/9/2007 11:58:00 AM PCO--P... |
| 273712 | IP-00DM49112W | SOS 271W1402-1P-N... | Parts - SOS | Closed | 5/9/2007 9:55:00 AM PCO--P... |
| 273712 | IP-00DM49112W | SOS 271W1402-1P-N... | Parts - SOS | Closed | 5/9/2007 9:01:00 AM PCO--P... |
| 273712 | IP-00DM49112W | SOS 271W1402-1P-N... | Parts - SOS | Closed | 5/8/2007 9:57:00 PM PCO--P... |
| 273712 | IP-00DM49112W | SOS 271W1402-1P-N... | Parts - SOS | Closed | 5/7/2007 7:50:00 AM PCO--P... |
| 273883 | IP-00D400015W | need a tag on the nos... | NCR Request | Closed | 5/7/2007 11:15:00 AM NCT--N... |
| 273712 | IP-00DM49112W | SOS 271W1402-1P-N... | Parts - SOS | Closed | 5/7/2007 7:37:00 AM PCO--P... |
| 273712 | IP-00DM49112W | SOS 271W1402-1P-N... | Parts - SOS | Closed | 5/7/2007 8:11:00 AM PCO--P... |
| 273712 | IP-00DM49112W | SOS 271W1402-1P-N... | Parts - SOS | Closed | 5/7/2007 5:22:00 AM PCO--P... |
| 273883 | IP-00D400015W | need a tag on the nos... | NCR Request | Closed | 5/7/2007 5:50:00 PM $$ Mfg--M... |
| 273883 | IP-00D400015W | need a tag on the nos... | NCR Request | Closed | 5/7/2007 2:57:00 PM Mfg--MF... |
| 273883 | IP-00D400015W | need a tag on the nos... | NCR Request | Closed | 5/7/2007 2:56:00 PM Mfg--MF... |
| 273883 | IP-00D400015W | need a tag on the nos... | NCR Request | Closed | 5/7/2007 2:55:00 PM NCT--N... |
| 273883 | IP-00D400015W | need a tag on the nos... | NCR Request | Closed | 5/7/2007 2:05:00 PM NCT--N... |
| 273883 | IP-00D400015W | need a tag on the nos... | NCR Request | Closed | 5/7/2007 1:04:00 PM NCT--N... |
| 273941 | IP-00DMBW502W | unable to install fwd dr... | MFG-Back Shop... | Closed | 5/8/2007 8:00:00 PM $$ Mfg--M... |
| 273941 | IP-00DMBW502W | unable to install fwd dr... | MFG-Back Shop... | Closed | 5/8/2007 6:55:00 AM Mfg--MF... |
| 273941 | IP-00DMBW502W | unable to install fwd dr... | MFG-Back Shop... | Closed | 5/8/2007 6:55:00 AM Mfg--MF... |
| 273941 | IP-00DMBW502W | unable to install fwd dr... | MFG-Back Shop... | Closed | 5/8/2007 6:55:00 AM Mfg--MF... |
| 273941 | IP-00DMBW502W | unable to install fwd dr... | MFG-Back Shop... | Closed | 5/8/2007 6:54:00 AM Mfg--MF... |
| 273941 | IP-00DMBW502W | unable to install fwd dr... | MFG-Back Shop... | Closed | 5/8/2007 6:49:00 AM Mfg--MF... |
| 273941 | IP-00DMBW502W | unable to install fwd dr... | MFG-Back Shop... | Closed | 5/7/2007 5:31:00 PM Mfg--MF... |
| 273941 | IP-00DMBW502W | unable to install fwd dr... | MFG-Back Shop... | Closed | 5/7/2007 3:44:00 PM Mfg--MF... |
| 273941 | IP-00DMBW502W | unable to install fwd dr... | MFG-Back Shop... | Closed | 5/7/2007 2:55:00 PM Mfg--MF... |

FIG. 7

An Example of Using Algorithims for Discovery of Probabilistic Precedence Networks

| Delay records: Line=629 CC=121 | | | | | | | | |
|---|---|---|---|---|---|---|---|---|
| IP | StartDelay | EndDelay | CycleDelay | ProcessEn... | ProcessDel... | Scheduled... | ActualHrs | ProcessHrs |
| IP-0000003235 | 472.0 | -35.0 | -507.0 | -36.0 | -508.0 | 508.0 | 1.0 | 0.0 |
| IP-0000003236 | 472.0 | 55.0 | -417.0 | -36.0 | -508.0 | 508.0 | 91.0 | 0.0 |
| IP-0000003394 | 0.0 | 198.0 | 0.0 | 61.0 | 0.0 | 14.0 | 0.0 | 0.0 |
| IP-0000003437 | 0.0 | 102.0 | 0.0 | -5.0 | 0.0 | 8.0 | 0.0 | 0.0 |
| IP-0000003530 | 0.0 | 78.0 | 0.0 | -17.0 | 0.0 | 16.0 | 0.0 | 0.0 |
| IP-0000007429 | 0.0 | 102.0 | 0.0 | -17.0 | 0.0 | 19.0 | 0.0 | 0.0 |
| IP-0000012269 | 0.0 | 107.0 | 0.0 | 107.0 | 0.0 | 18.0 | 0.0 | 0.0 |
| IP-0000017117 | 0.0 | 102.0 | 0.0 | -12.0 | 0.0 | 19.0 | 0.0 | 0.0 |
| IP-0000018114 | 0.0 | 126.0 | 0.0 | -11.0 | 0.0 | 13.0 | 0.0 | 0.0 |
| IP-0000020764 | 0.0 | 102.0 | 0.0 | -1.0 | 0.0 | 4.0 | 0.0 | 0.0 |
| IP-0000023001 | -9.0 | 54.0 | 63.0 | -11.0 | -2.0 | 10.0 | 73.0 | 0.0 |
| IP-0000023140 | 0.0 | 198.0 | 0.0 | -19.0 | 0.0 | 20.0 | 0.0 | 0.0 |
| IP-0000023429 | 0.0 | 198.0 | 0.0 | -22.0 | 0.0 | 25.0 | 0.0 | 0.0 |
| IP-0000035982 | 0.0 | 198.0 | 0.0 | 71.0 | 0.0 | 20.0 | 0.0 | 0.0 |
| IP-0000038498 | 20.0 | 54.0 | 34.0 | 21.0 | 1.0 | 2.0 | 36.0 | 1.0 |
| IP-0000038499 | 0.0 | 21.0 | 0.0 | 20.0 | 0.0 | 5.0 | 0.0 | 0.0 |
| IP-0000038500 | 21.0 | 55.0 | 34.0 | 21.0 | 0.0 | 1.0 | 35.0 | 1.0 |
| IP-0000038988 | 17.0 | 13.0 | -4.0 | 13.0 | -4.0 | 5.0 | 1.0 | 4.0 |
| IP-0000042656 | -4.0 | 79.0 | 83.0 | -1.0 | 3.0 | 1.0 | 84.0 | 4.0 |
| IP-0000042661 | -4.0 | 79.0 | 83.0 | -1.0 | 3.0 | 1.0 | 84.0 | 4.0 |
| IP-0000047126 | 156.0 | 198.0 | 42.0 | 136.0 | -20.0 | 19.0 | 61.0 | -1.0 |
| IP-0000050618 | 148.0 | 198.0 | 50.0 | 136.0 | -12.0 | 12.0 | 62.0 | 0.0 |
| IP-0000052860 | 60.0 | 102.0 | 42.0 | 56.0 | -4.0 | 5.0 | 47.0 | 0.0 |
| IP-0000053036 | 0.0 | 198.0 | 0.0 | 141.0 | 0.0 | 18.0 | 0.0 | 0.0 |
| IP-0000053038 | 0.0 | 0.0 | 0.0 | 0.0 | 0.0 | 0.0 | 0.0 | 0.0 |
| IP-0000055742 | 0.0 | 55.0 | 0.0 | -1.0 | 0.0 | 424.0 | 0.0 | 0.0 |
| IP-0000055630 | 179.0 | 231.0 | 52.0 | 231.0 | 52.0 | 16.0 | 68.0 | 68.0 |
| IP-00D128083M | 0.0 | 116.0 | 0.0 | 115.0 | 0.0 | 4.0 | 0.0 | 0.0 |

FIG. 12

SYSTEM AND METHOD FOR DEPENDENCY AND ROOT CAUSE DISCOVERY

FIELD OF THE DISCLOSURE

The embodiments described herein are related to root cause discovery, more particularly, to methods and systems for retrieving and processing data to provide dependency and root cause information for a process.

BACKGROUND

Conventional process analysis software tools utilize general purpose scheduling, critical path method (CPM) modeling, and simulation, which require static and well-defined process knowledge when dealing with the dynamic nature of a process. When analyzing large scale processes, such as airplane or automotive assembly, the dynamic variability of processes requires not only knowledge about inter-dependency among processes and tasks but also a capability for data mining to account for historic performance. However, conventional tools suffer from: 1) a lack of end-to-end real-time process dependency determination and monitoring, 2) taking a knowledge-centric approach, and 3) being less capable of addressing large-scale problems.

Currently there is no holistic solution for process task flow analysis applicable for end-to-end, large-scale, and complex processes. Thus, what is needed is a system and method that enables efficient management of end-to-end processes with a large number of tasks involved. Our approach to managing real-time situation and knowledge extracted from the historic performance provides greater flexibility and reflect the reality of dynamic process requirements.

SUMMARY

In one aspect, described herein is a computerized method for retrieving and processing data to provide dependency and root cause information for a process. The computerized method includes receiving historic data for the process, mining the data for detecting temporal dependencies or precedence tasks in the process, generating a dependency graph in the form of directed acyclic graph (DAG), aggregating the historic dependency graph into a probabilistic precedence network (PPN), pruning the PPN by filtering out less likely dependencies of the process and keeping robust dependencies of the process and removing conditional independence relationships from DAG, and presenting the results to a user.

In another aspect, described herein is a system that presents mission critical task relationships in the form of dependencies through which users can identify process bottlenecks via root cause information. The system includes a memory area and a processor. The processor is programmed to collect historic data for the process, detect temporal dependencies or precedence tasks from the historic data, and generate dependency relations via probabilistic precedence networks (PPN), from which the root causes of process delays can be extracted. In addition, a network communication device may be included in the system for communicating with remote database server to retrieve the historic data that are stored remotely on the database server.

BRIEF DESCRIPTION OF THE DRAWINGS

FIG. 7 is an illustrative example of query result for knowledge-based process delay information acquired by Knowledge-based Process Delay Tracker.

FIG. 12 is an illustrative example of query result for task delay information from historic data acquired by data mining.

DETAILED DESCRIPTION

The subject matter of the present disclosure is described with specificity herein to meet statutory requirements. However, the description itself is not intended to limit the scope of the claimed subject matter. Rather, the inventors have contemplated that the claimed subject matter might also be embodied in other ways, to include different steps or combinations of steps similar to the ones described in this document, in conjunction with other present or future technologies. Moreover, although the terms "step," "block," and/or "operation" may be used herein to connote different elements of methods employed, the terms should not be interpreted as implying any particular order among or between various steps herein disclosed unless and except when the order of individual steps is explicitly described.

In order to manage complex manufacturing process flow analysis, numerous software tools that require adequate training and maintenance are needed, which translates into resources utilization and costs. As mentioned above, conventional solutions rely on well-defined knowledge of processes from which process states can be monitored. The systems and methods described herein utilize a hybrid of both data and knowledge-base approach so that the dynamic nature of a process may be accurately captured and analyzed. Further, the systems and methods described herein address a capability of incorporating uncertainty into a dependency network caused by the dynamic nature of large scale system processes.

The systems and methods described herein can account for real-time dynamic process variation through integrated analysis of at least data mining, critical path formulation, dependency discovery, delay cause identification, and process lead time prediction/simulation. This hybrid approach, using both historic data and domain knowledge, enables automatic discovery of process dependency relationships and root causes of process delay that cannot be done in conventional systems and methods. Thus, unlike conventional systems and process that rely on expert knowledge, by eliminating human involvement, the systems and methods described herein can address large-scale process flow more efficiently.

Figure 1:
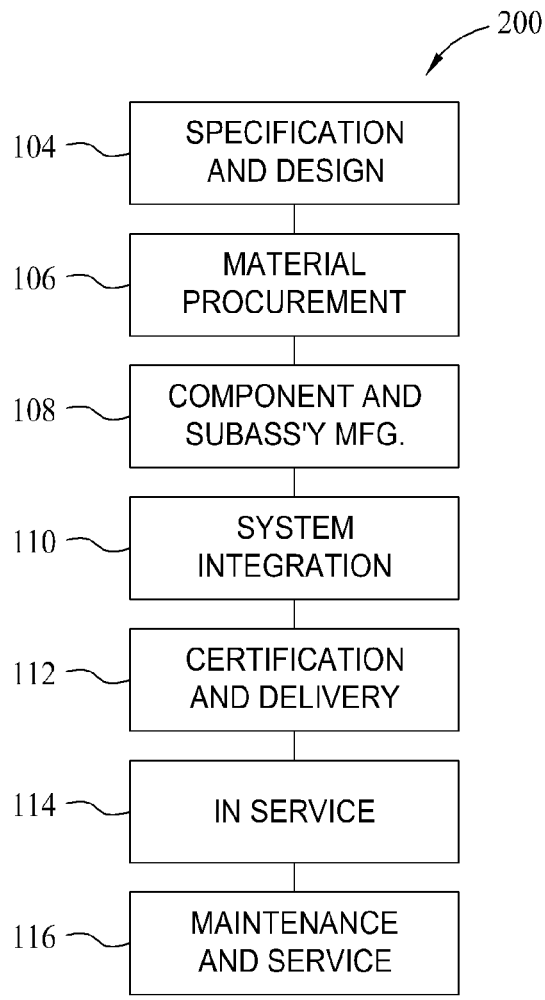
FIG. 1 is a flow diagram of aircraft production and service methodology.
Figure 2:
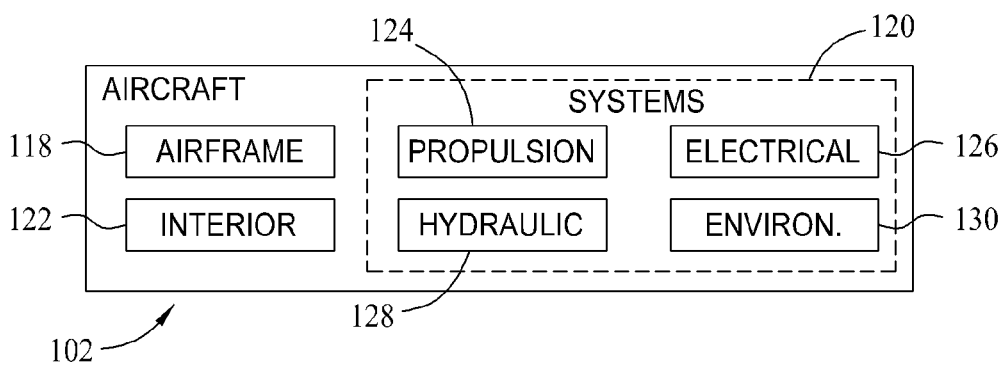
FIG. 2 is a block diagram of an aircraft.

Now referring more particularly to the drawings, embodiments of the disclosure may be described in the context of aircraft manufacturing and service method 100 as shown in FIG. 1 and an aircraft 102 as shown in FIG. 2. During pre-production, aircraft manufacturing and service method 100 may include specification and design 104 of aircraft 102 and material procurement 106.

During production, component and subassembly manufacturing 108 and system integration 110 of aircraft 102 takes place. Thereafter, aircraft 102 may go through certification and delivery 112 in order to be placed in service 114. While in service by a customer, aircraft 102 is scheduled for routine maintenance and service 116 (which may also include modification, reconfiguration, refurbishment, and so on).

Each of the processes of aircraft manufacturing and service method 100 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of venders, subcontractors, and suppliers; and an operator may be an airline, leasing company, military entity, service organization, and so on.

As shown in FIG. 2, aircraft 102 produced by aircraft manufacturing and service method 100 may include airframe 118 with a plurality of systems 120 and an interior 122. Examples of systems 120 include one or more of propulsion system 124, electrical system 126, hydraulic system 128, and environmental system 130. Any number of other systems may be included in this example. Although an aerospace example is shown, the principles of the disclosure may be applied to other industries, such as the automotive industry.

Apparatus and methods embodied herein may be employed during any one or more of the stages of aircraft manufacturing and service method 100. For example, without limitation, components or subassemblies corresponding to component and subassembly manufacturing 108 may be fabricated or manufactured in a manner similar to components or subassemblies produced while aircraft 102 is in service.

Also, one or more apparatus embodiments, method embodiments, or a combination thereof may be utilized during component and subassembly manufacturing 108 and system integration 110, for example, without limitation, by substantially expediting assembly of or reducing the cost of aircraft 102. Similarly, one or more of apparatus embodiments, method embodiments, or a combination thereof may be utilized while aircraft 102 is in service, for example, without limitation, to maintenance and service 116 may be used during system integration 110 and/or maintenance and service 116 to determine whether parts may be connected and/or mated to each other.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

Figure 3:
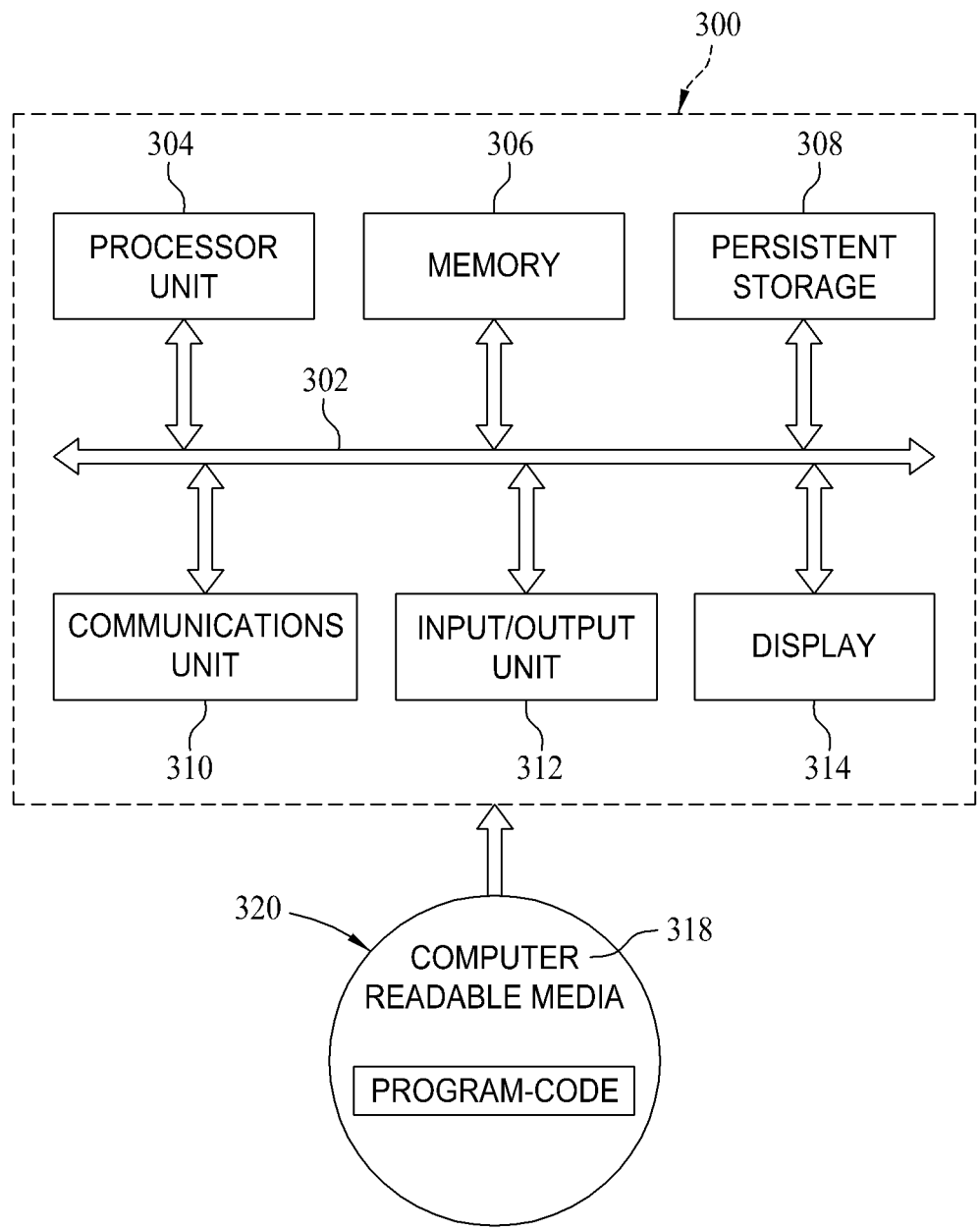
FIG. 3 is a diagram of a data processing system in accordance with an illustrative embodiment.

Turning now to FIG. 3, a diagram of a data processing system 300 is depicted in accordance with an illustrative embodiment. Specifically, data processing system 300 is one embodiment of a computer system upon which the described embodiment can be run. In this illustrative example, data processing system 300 includes communications fabric 302, which provides communications between processor unit 304, memory 306, persistent storage 308, communications unit 310, input/output (I/O) unit 312, and display 314.

Processor unit 304 serves to execute instructions for software that may be loaded into memory 306. Processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices. A storage device is any piece of hardware that is capable of storing information either on a temporary basis and/or a permanent basis. Memory 306, in these examples, may be, for example, without limitation, a random access memory or any other suitable volatile or non-volatile storage device. Persistent storage 308 may take various forms depending on the particular implementation. For example, without limitation, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, without limitation, a removable hard drive may be used for persistent storage 308.

Communications unit 310, in these examples, provides for communications with other data processing systems or devices. In these examples, communications unit 310 is a network interface card. Communications unit 310 may provide communications through the use of either or both physical and wireless communication links.

Input/output unit 312 allows for input and output of data with other devices that may be connected to data processing system 300. For example, without limitation, input/output unit 312 may provide a connection for user input through a keyboard and mouse. Further, input/output unit 312 may send output to a printer. Display 314 provides a mechanism to display information to a user.

Instructions for the operating system and applications or programs are located on persistent storage 308. These instructions may be loaded into memory 306 for execution by processor unit 304. The processes of the different embodiments may be performed by processor unit 304 using computer implemented instructions, which may be located in a memory, such as memory 306. These instructions are referred to as program code, computer usable program code, or computer readable program code that may be read and executed by a processor in processor unit 304. The program code in the different embodiments may be embodied on different physical or tangible computer readable media, such as memory 306 or persistent storage 308.

Program code 316 is located in a functional form on computer readable media 318 that is selectively removable and may be loaded onto or transferred to data processing system 300 for execution by processor unit 304. Program code 316 and computer readable media 318 form computer program product 320 in these examples. In one example, computer readable media 318 may be in a tangible form, such as, for example, an optical or magnetic disc that is inserted or placed into a drive or other device that is part of persistent storage 308 for transfer onto a storage device, such as a hard drive that is part of persistent storage 308. In a tangible form, computer readable media 318 also may take the form of a persistent storage, such as a hard drive, a thumb drive, or a flash memory that is connected to data processing system 300. The tangible form of computer readable media 318 is also referred to as computer recordable storage media. In some instances, computer readable media 318 may not be removable.

Alternatively, program code 316 may be transferred to data processing system 300 from computer readable media 318 through a communications link to communications unit 310 and/or through a connection to input/output unit 312. The communications link and/or the connection may be physical or wireless in the illustrative examples. The computer readable media also may take the form of non-tangible media, such as communications links or wireless transmissions containing the program code.

In some illustrative embodiments, program code 316 may be downloaded over a network to persistent storage 308 from another device or data processing system for use within data processing system 300. For instance, program code stored in a computer readable storage medium in a server data processing system may be downloaded over a network from the server to data processing system 300. The data processing system providing program code 316 may be a server computer, a client computer, or some other device capable of storing and transmitting program code 316.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 3 can be varied from the illustrative examples shown.

As one example, a storage device in data processing system 300 is any hardware apparatus that may store data. Memory 306, persistent storage 308 and computer readable media 318 are examples of storage devices in a tangible form.

In another example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 306 or a cache such as that found in an interface and memory controller hub that may be present in communications fabric 302.

Figure 4:
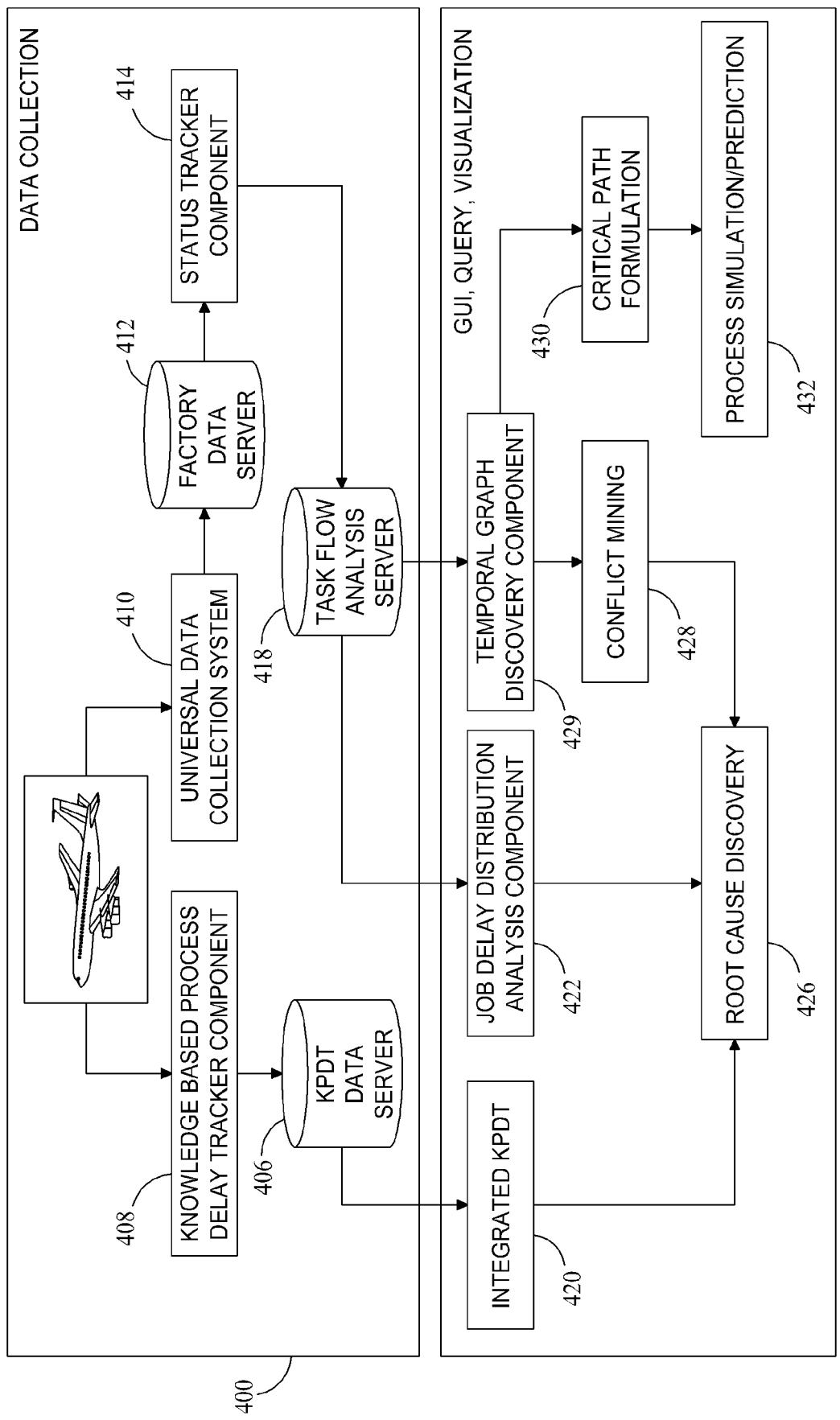
FIG. 4 is an exemplary block diagram illustrating the system's software components for retrieving and processing data to generate data mining information for a process.
Figure 5:
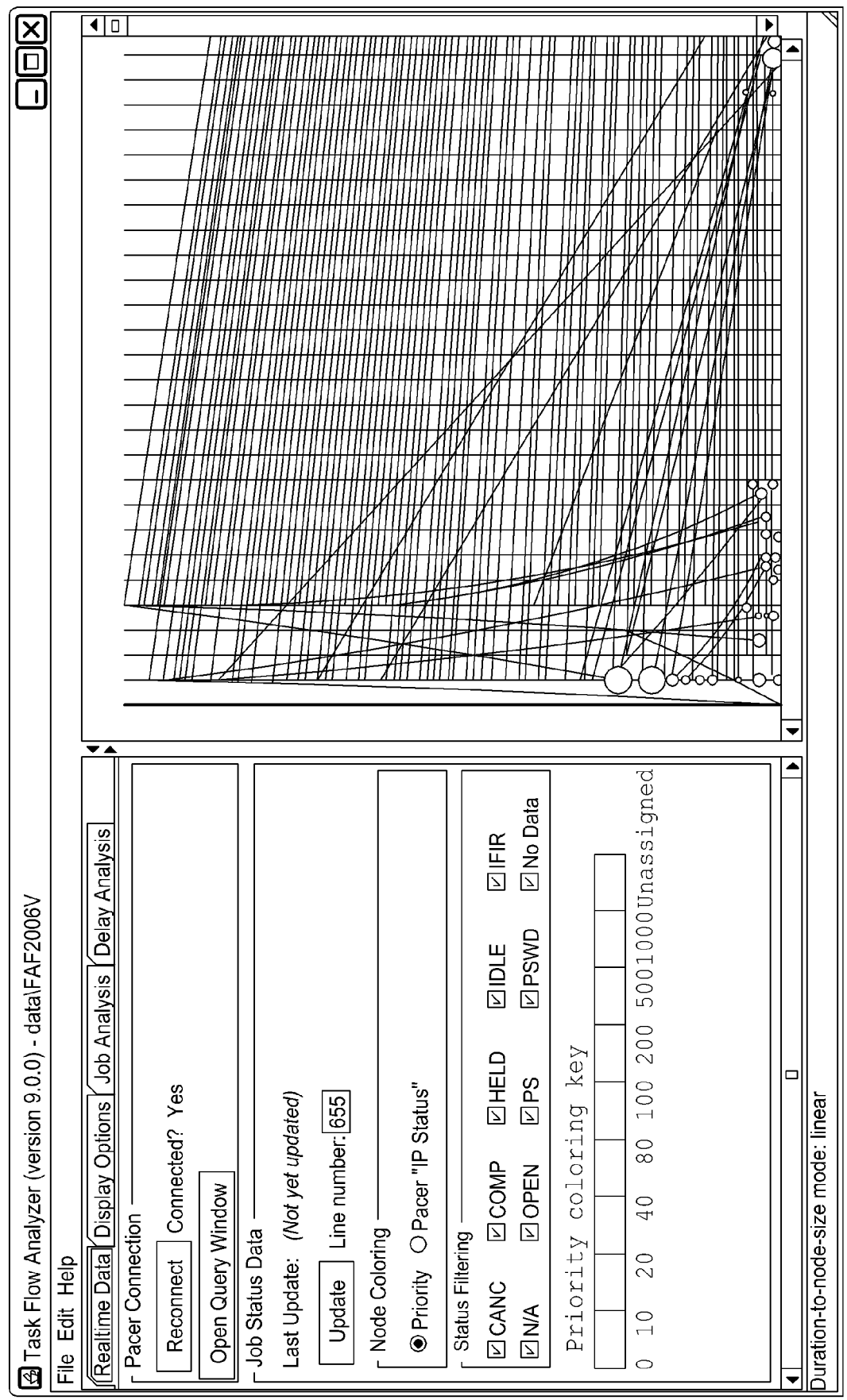
FIG. 5 is an exemplary screen shot illustrating a top window for query monitoring data and task status visualization

FIG. 4 is an application flow diagram 400 further illustrating an operation of the system in FIG. 3 configured to provide a solution for process task flow analysis applicable for end-to-end, large-scale, and complex processes. Exemplary components of the flow diagram 400 include, but are not limited to, Universal Data Collection System (UDCS) 410, a Factory Data Server 412, a Task Status Tracker component 414, a Task Flow Analysis (TFA) Server 418, a Knowledge-based Process Delay Tracker component (KPDT) 408, KPDT Data Server 406, Integrated KPDT 420, a Temporal Graph Discovery component 429, a Critical Path Formulation component 430, Job Delay Distribution Analysis component 422, Conflict Mining component 428, Root Cause Discovery component 426, and Process Simulation & Prediction component 432.

Integrated KPDT refers to Knowledge-based Process Delay Tracker. The knowledge base contains the detailed history of task status including failure or delay information from rework, repair, part shortage, operator request for parts, order status, etc. The output of KPDT block is fed into root cause block to validate the causes discovered by the discovery algorithm.

Job Delay Distribution Analysis is to compute a set of statistical distribution of process delay based on the task status data. Actual distribution can be modeled by data mining algorithm that can automatically discover the distribution from the Task Flow Analysis Server. Users can also specify the distribution based on his or her knowledge. Typical distribution functions used are uniform distribution, normal distribution, and triangular distribution.

Dependency Graph Discovery is to automatically find the task dependency relationships and represent them in a directed acyclic graph (DAG). Building a precedence network manually (post-it approach) is time consuming and labor-intensive. But automatic discovery of dependency graph from historical data base can not only save the cost and time but also provide a robust tooling capability for dynamic resource scheduling.

A precedence network also enables Critical Path Formulation that indicates which tasks are critical to overall mission, and thus become a subject to close monitoring. When tasks along this path are negatively impacted, operators should utilize means to alleviate down-stream impact.

Sometimes the scheduled tasks may not get started or finished on time. The actual execution of a task may deviate from its schedule. The Conflict Mining component is designed to find the deviated tasks.

It is important for modern business owners to optimize task schedule in terms of cycle time and resource availability. Modern system engineering tools provide means to utilize domain knowledge to plan resource and task scheduling. Although these methods are efficient for well-defined processes, most large scale end-to-end process creates controlled chaos that deemed such tools less effective. A key element described herein is a method of Root Cause Discovery which is a computational technique to find the candidate tasks that cause the overall process delay. A complex manufacturing process, such as airplane assembly, requires large number of tasks being executed in a certain sequence. When a delayed task causes cascading effect to the subsequent downstream tasks, users should understand the nature of the delay and the principal tasks causing such negative impact.

When task dependency information is available, Process Simulation & Prediction can be performed to find alternative schedule and to conduct what-if scenarios analysis that enables prediction of downstream impact due to a certain task delay in the upstream. Based on a precedence network, one can perform Monte Carlo methods to figure out detailed analysis, for instance, an impact analysis for process lead time (a minimum time required to complete the whole process) necessary for a best course of action under deteriorating conditions at factory floor. Process simulation can also be used to help resource allocation to minimize (or to completely avoid) downstream delay by rescheduling the resources to maintain the overall objective.

Referring back to FIG. 4, in embodiments, UDCS 410 is a turn-key network platform for factory floor data collection. Any application that requires a system to gather data of any type from any source on, for example factory floors, and distribute the data dynamically to one or more clients at the same time can use a UDCS-based data collection system. In one embodiment, the UDCS 410 monitors and updates task status from start time to finish time in assembly processes. A task may start with an "open" status and ends in a "complete" status. Other intermediate status points such as "canceled" and "idle" are also logged from online work instruction. The UDCS 410 may only keep the most current states for each assembly task in its monitoring data records. For example, once an airplane assembly process is completed, all the tasks involved are in "complete" status and the history of how the tasks are finished is lost.

In order to make the factory process data usable for task flow analysis and to perform data mining, a software component, for example, the Task Status Tracker component 414 is utilized. The Task Status Tracker component 414 tracks real time factory data from the factory data server 412, updates data periodically, and records the status changes in a relational database, for example, the TFA Data Server 418. In one embodiment, the Task Status Tracker component 414 captures a foot print or task status that changes during a factory process, which can also be used for further analysis.

In embodiments, the Knowledge-based Process Delay Tracker component 408 may be used by manufacturing operations, manufacturing engineering, and other support organizations to document and respond to issues that delay a process, for example, the orderly aircraft build process. This is a primary capability for the assembly operations with a secondary use by support organizations to identify and solve chronic issues. In one embodiment, the KPDT Data Server 406 keeps permanent records of, for example, shop requests for manufacturing assistance and a resolution of each request.

Because KPDT data may not be directly available to end user applications, in one embodiment, data is extracted from a KPDT web site using, for example, "screen scraping" technology. That is, posting a query in a form of an HTTP 'GET' request, and then capturing and analyzing the HTML response from the web server.

Figure 6A:
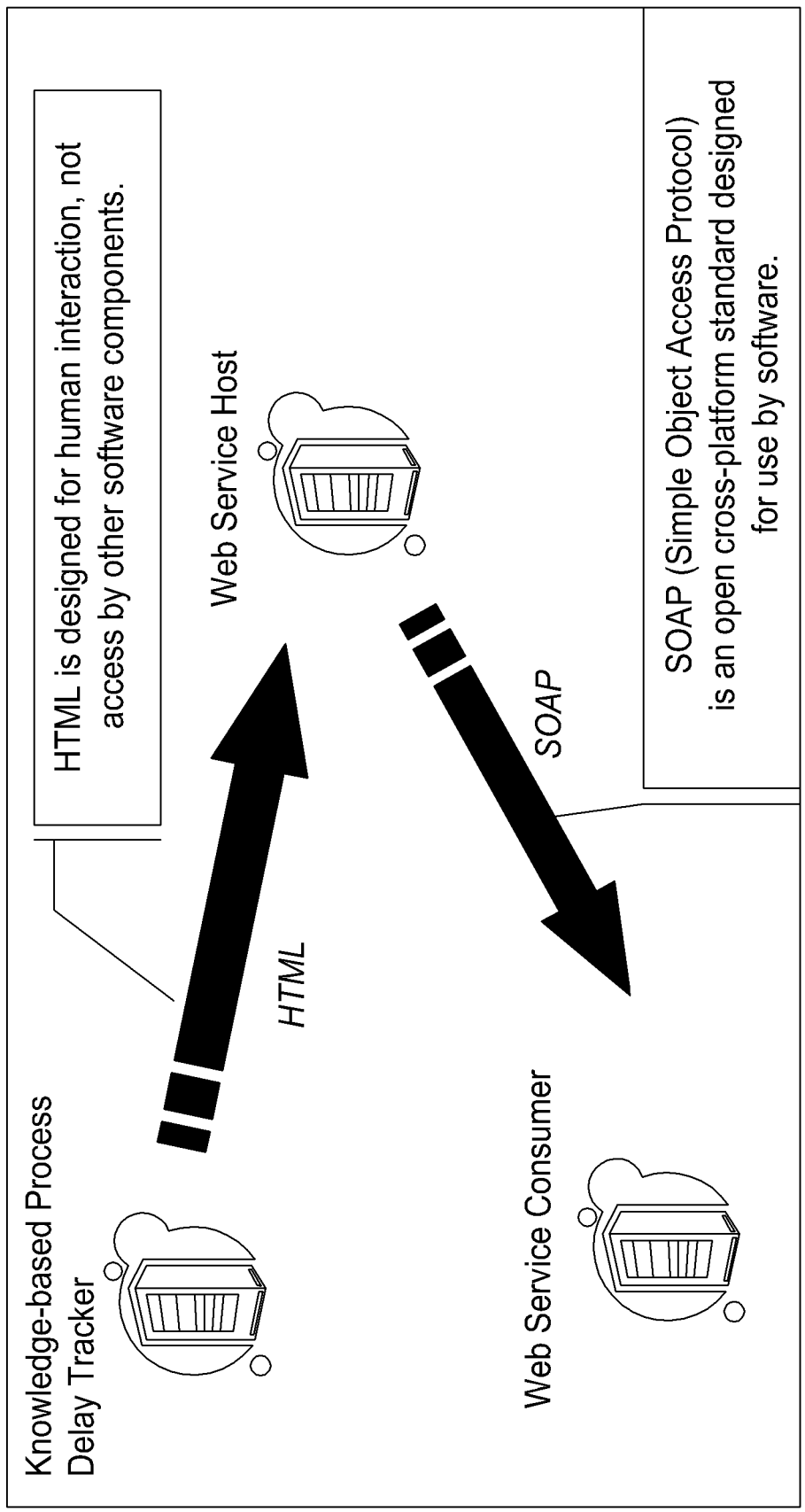
FIG. 6A is an exemplary block diagram illustrating an integration of knowledge-based process delay tracker.
Figure 6B:
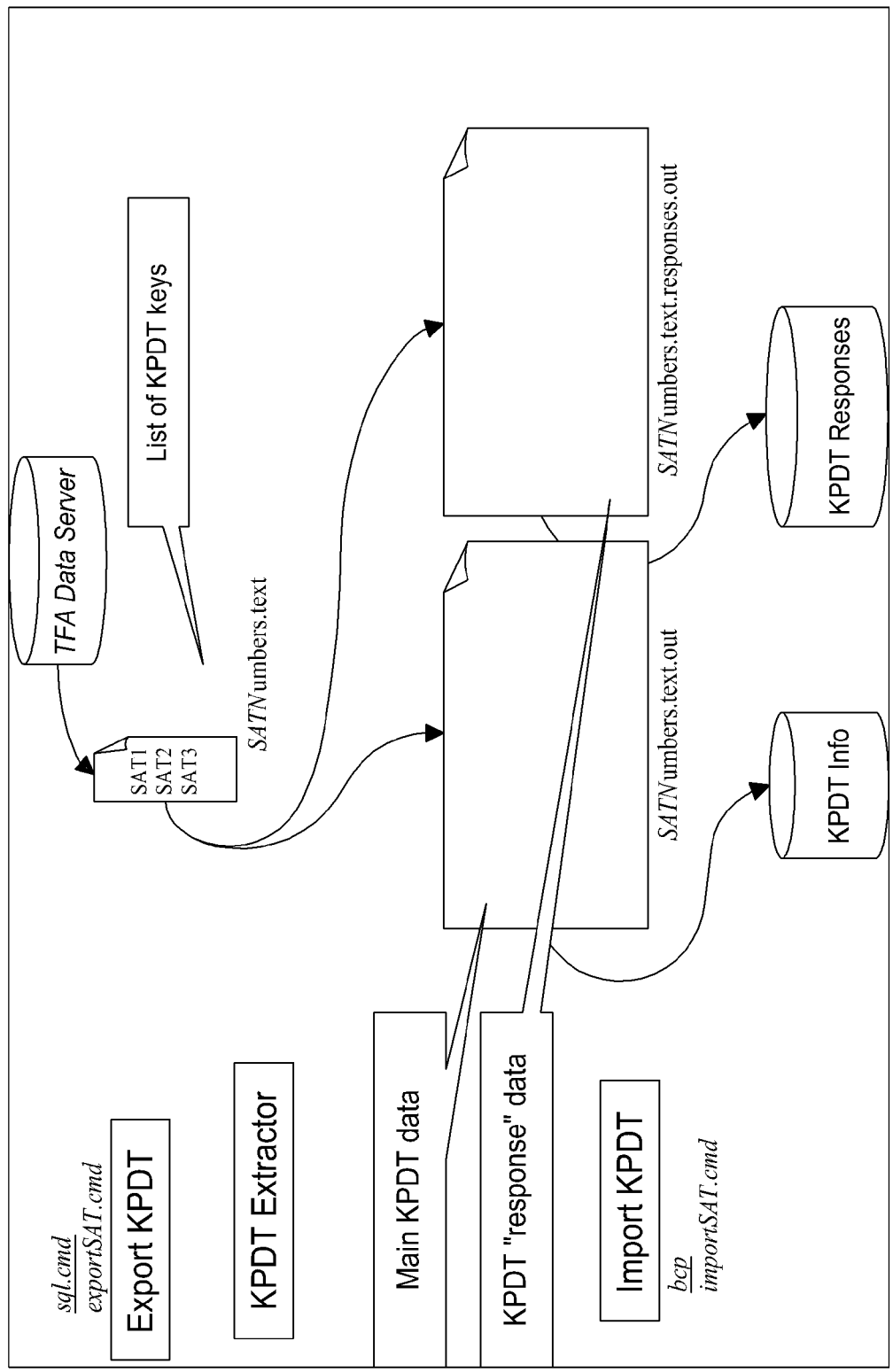
FIG. 6B is an exemplary block diagram illustrating a flow of knowledge-based process delay tracker.

In embodiments, the KPDT data, which is stored in the KPDT data server 406, consists of two tables: 1) a table containing KPDT key records, each of which includes at least one of the following: job/task number, and 2) a table with related KPDT responses. These two tables have a one-to-many relationship. The KPDT data obtained in the first step is analyzed and imported into these two tables. The KPDT data is related to the TFA data that is stored in the TFA Data Server 418, via the job/task number field. See FIG. 6A and FIG. 6B for an exemplary detailed architecture and FIG. 7 for an exemplary screen shot of a query result from KPDT data 406 acquired by KPDT 408.

In embodiments, from the historic data collected by the status tracker component 414, task dependency relationships can be automatically discovered and represented as a dependency graph in the form of a directed acyclic graph (DAG). The task dependency relationship can be constrained by the task start and end time. They can also be constrained by resources, such as availability of toolkits, condition of work platform, and other shared equipments. Temporal dependency refers to the dependency among tasks that are related through time constraint. And the temporal dependency graph is called precedence graph or precedence network.

Figure 8:
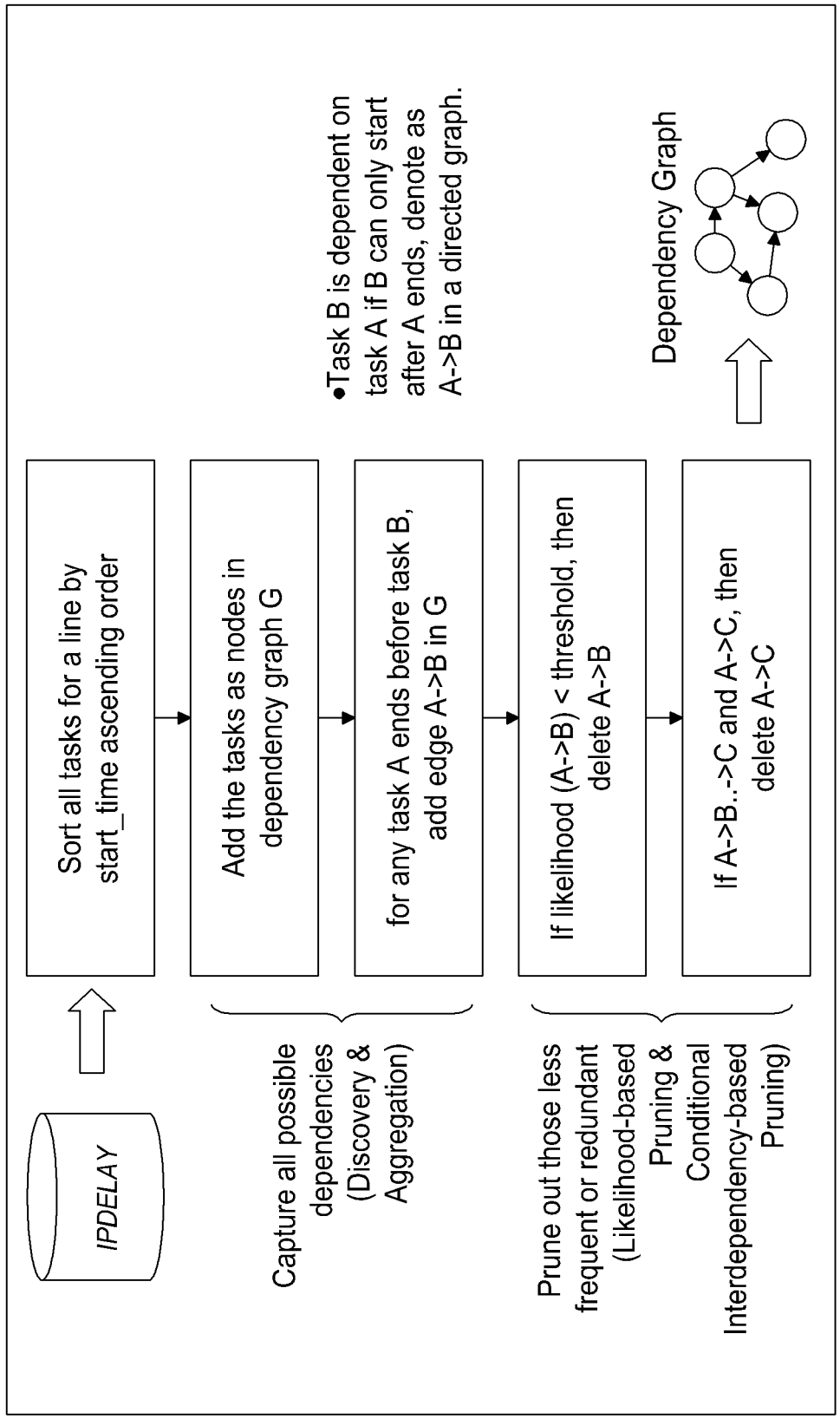
FIG. 8 shows a flow chart of dependency discovery.
Figure 9:
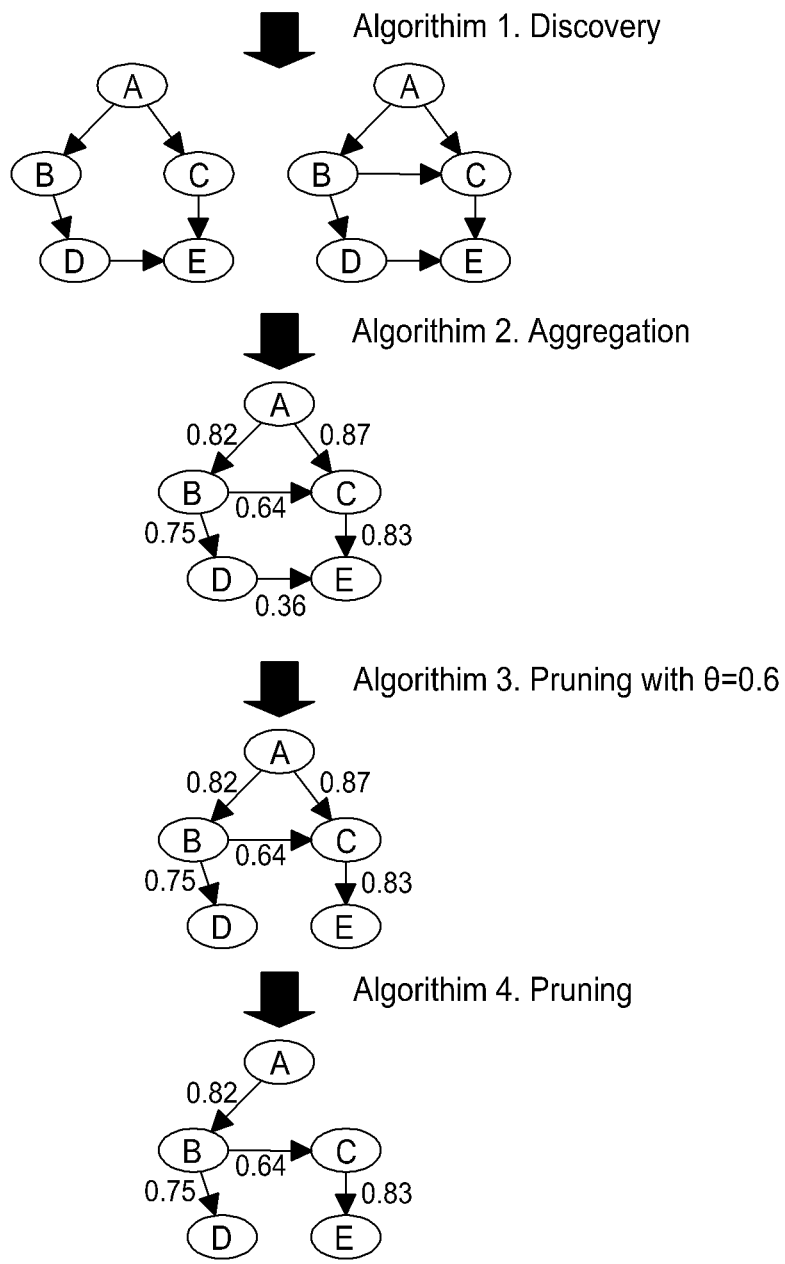
FIG. 9 is an illustrative example of using algorithms for discovery of probabilistic precedence networks.

FIG. 8 shows a flow chart of dependency discovery. The algorithms used for dependency discovery are described in the following paragraphs.

Algorithms 1 and 2 generate a DAG for the entire process that includes all the required tasks to manufacture a product, such as an airplane or an automobile. In one embodiment, these processes repeat themselves with some variations depending upon customer requirements. Such dynamic variability introduces uncertainty in dependency relationships. A typical precedence network's DAG in the algorithms below is described in Graph Markup Language (GraphML). FIG. 6 is an illustration a glance of a precedence network DAG.

Algorithm 1

Step 1: Sort tasks in ascending order based on start time. Set current task Tc=first task;
Step 2: Add the current task (Tc) in precedence graph g;
Step 3: for each task node Tn in G, if Tc's start time is later than Tn's finish time, then add arc Tn→Tc;
Step 4: Set Tc=next task in the ordered task list;
Step 5: repeat Step 2 and Step 4 until the sorted list is navigated through; and
Step 6: Output the graph G.

The basis of Algorithm 1 can be expressed as: "If task B depends on task A, then task B can not start before task A is finished." Because the precedence network is a DAG, it may also be referred to as a "precedence graph."

In embodiments, Algorithms 1 and 2 discover dependency relationships from data for a single chain of an entire process. The entire process may be repeated again and again to manufacture a complex product such as airplane, automobile, and the like. However, not every line has the exact same set of tasks and/or follows the same execution plan. In order to reflect this reality, a likelihood of dependency may be needed. Algorithm 2 aggregates the historic dependency DAGs into a probabilistic precedence network (PPN).

Algorithm 2

Step 1: When a Dependence Graph G discovered for a new line process;
Step 2: For each node N in C, if N is not in PPN, then add N into PPN;
Step 3: For each edge E in G;
Step 3.1: If the edge E is not in PPN, add E into PPN;
Step 3.2: Counter(E)++;
Step 4: Repeat Step 1 through Step 3 until all the Dependence Graphs are aggregated into PPN;
Step 5: For each edge E in PPN, its probability of dependency $p(E)$=Counter(E)/total-number-of-line-processes; and
Step 6: Output PPN.

In embodiments, the discovered PPN using Algorithm 1 and 2 includes the complete set of all the possible temporal dependency relationships reflected in the historic data. In one embodiment, the temporal dependencies are represented as directed arcs in the PPN, and each arc has a probability attribute encoding the likelihood of dependency. Some dependencies appear more often in the past processes recorded in the Task Flow Analyzer Server 418 than others. These dependencies are likely to be robust and better reflect the normal task sequence. In one embodiment, a pruning procedure is applied onto the discovered PPN to filter out less likely dependencies by removing the infrequent or less robust arcs in PPN. The likelihood of dependencies is used as a pruning criterion. The threshold value of likelihood can be specified by a user. The arcs with probability of dependency exceeding the threshold will be kept in the PPN and considered for out-of-sequence analysis.

Algorithm 3 (below) describes the likelihood-based pruning procedure for generating robust temporal dependency. The probability of dependency $p(E)$ is the same as in the Algorithm 2. The threshold value "e" is predefined by a user and can be different for different domains. As a result of applying Algorithm 3, the PPN is less dense than in Algorithm 2.

Algorithm 3

Step 1: Given PPN generated from Algorithm 2, and likelihood threshold e;
Step 2: For each arc E, if its probability of dependency P(E)<e then delete E; and
Step 3: Output the PPN.

After the likelihood-based pruning of the PPN, the PPN contains only those arcs representing highly reliable dependency relationships. However, some arcs may be redundant. For example, if task C can not start before task B, and task B can not start before task A, then the existence of these two dependency relationships implies an indirect dependency relationship between A and C, that is, task C can not start before task A. Therefore, the relationship between A and C is conditionally independent given B. Equivalently, in PPN, if there is an arc from A to B and an arc from B to C, then there is no need for an arc from A to C. Thus, if the arc A to C exists in the dependency graph, it should be removed.

Algorithm 4 prunes the PPN by removing the conditionally independent arcs from the precedence graph.

Algorithm 4

Step 1: Give precedence network PPN generated from Algorithm 3;
Step 2: For each arc from node A to C, if there exists an intermediate node B that has an incoming arc from the node A and an outgoing arc to the node C, then delete the arc from node A to C;
Step 3: Output PPN.

Figure 10:
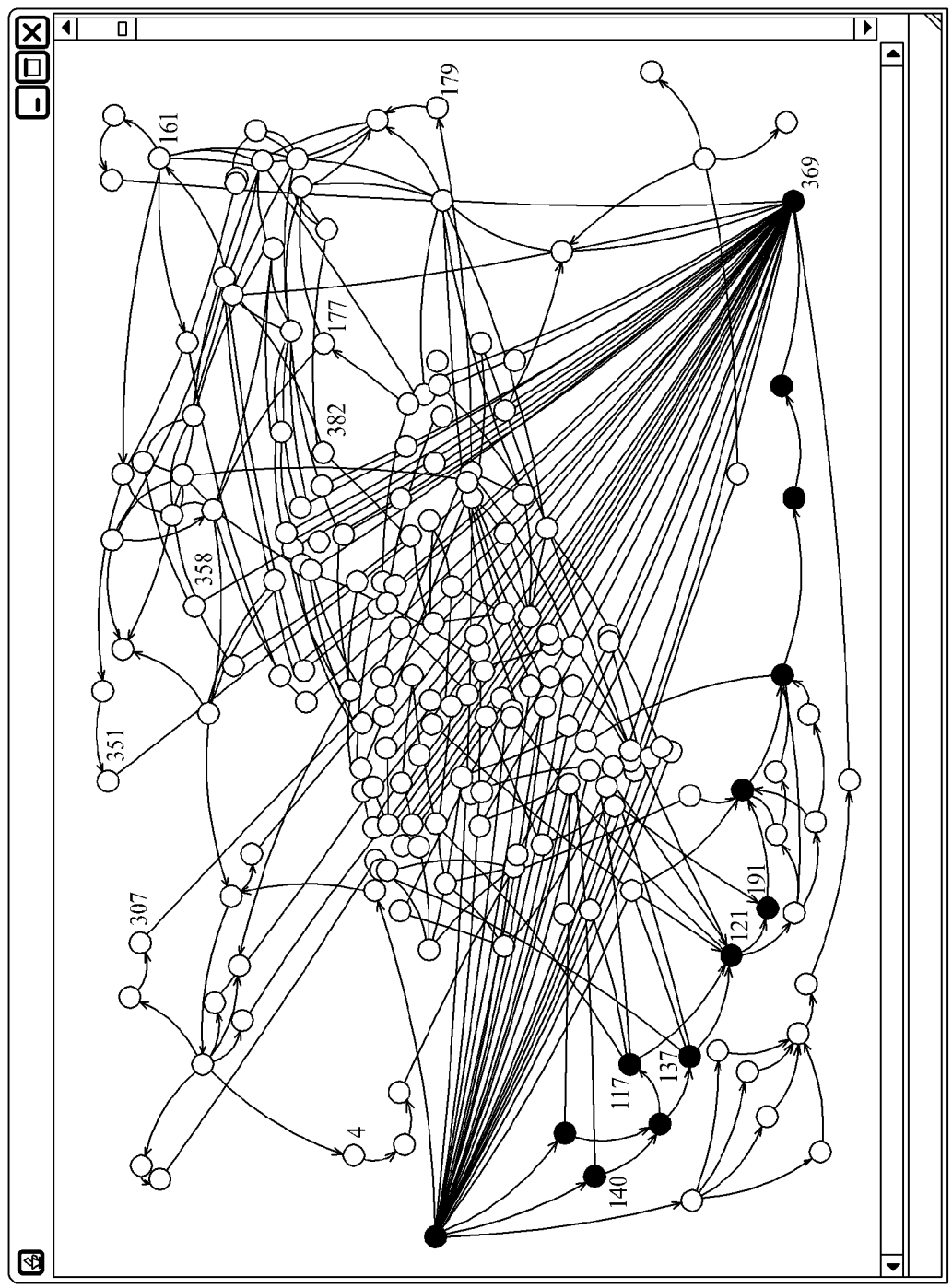
FIG. 10 is an exemplary graph illustrating a task dependency graph.

FIG. 10 shows an exemplary dependency graph discovered for an airplane assembly process using Algorithms 1, 2, 3 and 4. Each task is labeled with a number as its ID. Note that the graph only shows the reliable precedence relationships whose frequency exceeds the user-specified threshold.

A precedence network discovered by the above algorithms enables the critical path formulation. Those tasks that are critical to the overall performance in terms of completion time can be identified by Critical Path Methods (CPM). CPM is a key ingredient for task flow analysis. It finds the critical path that consists of a sequence of tasks that must be completed on time for the overall process to be completed on schedule. The length of the critical path represents a minimum time required to complete the whole process, which is known as the process lead time (also called process makespan). Delays on the tasks that are on the critical path thus directly impact the process lead time.

In end-to-end process management, the prediction capability is very important to forecast how long it is going to take for the whole process to be finished when a task is delayed for certain amount of time. It is also helpful to identify the candidate tasks that may speedup, if possible, to reduce the delay of the whole process.

Figure 11A:
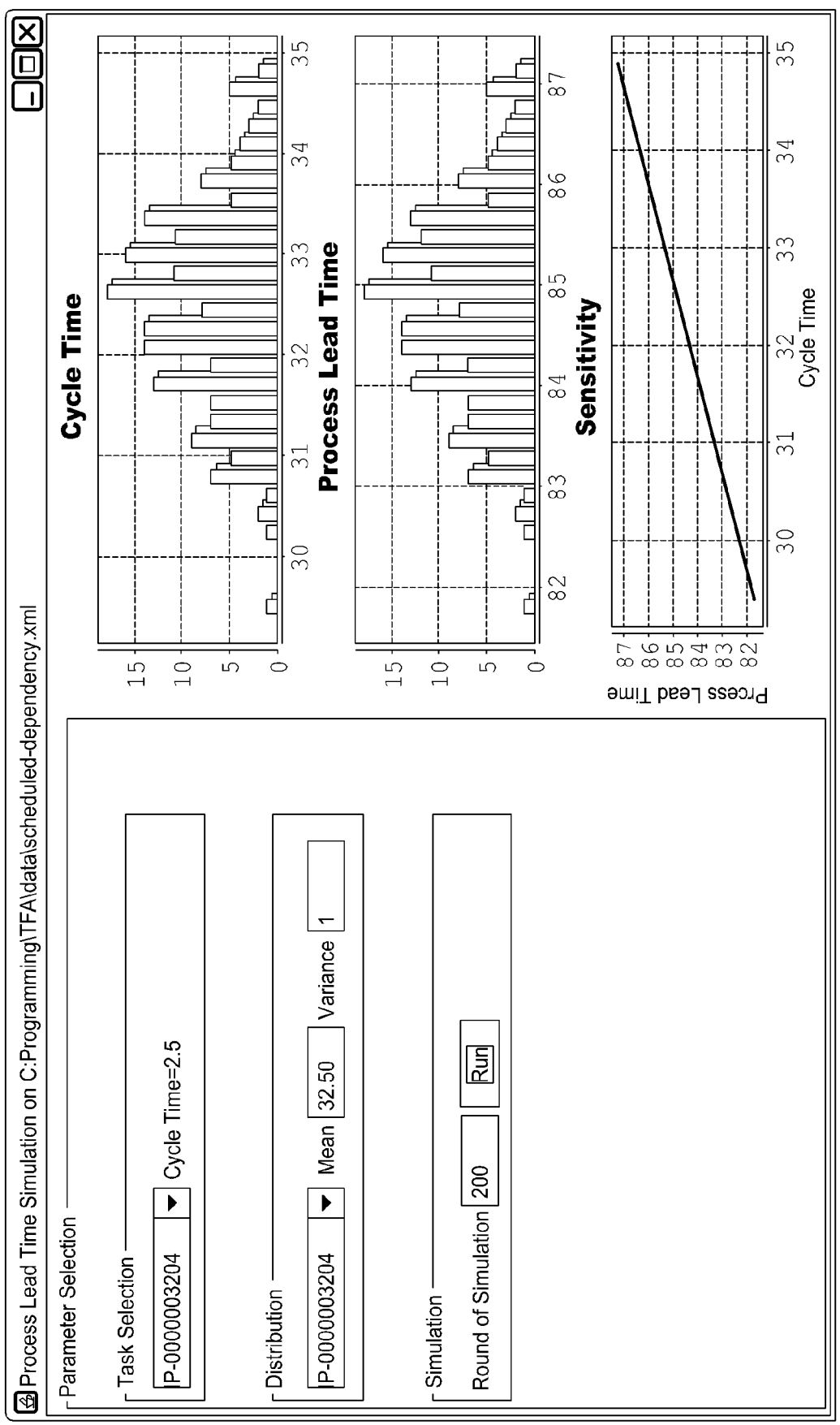
FIGS. 11A and 11B are exemplary graphs illustrating process lead time simulation and sensitivity.
Figure 11B:
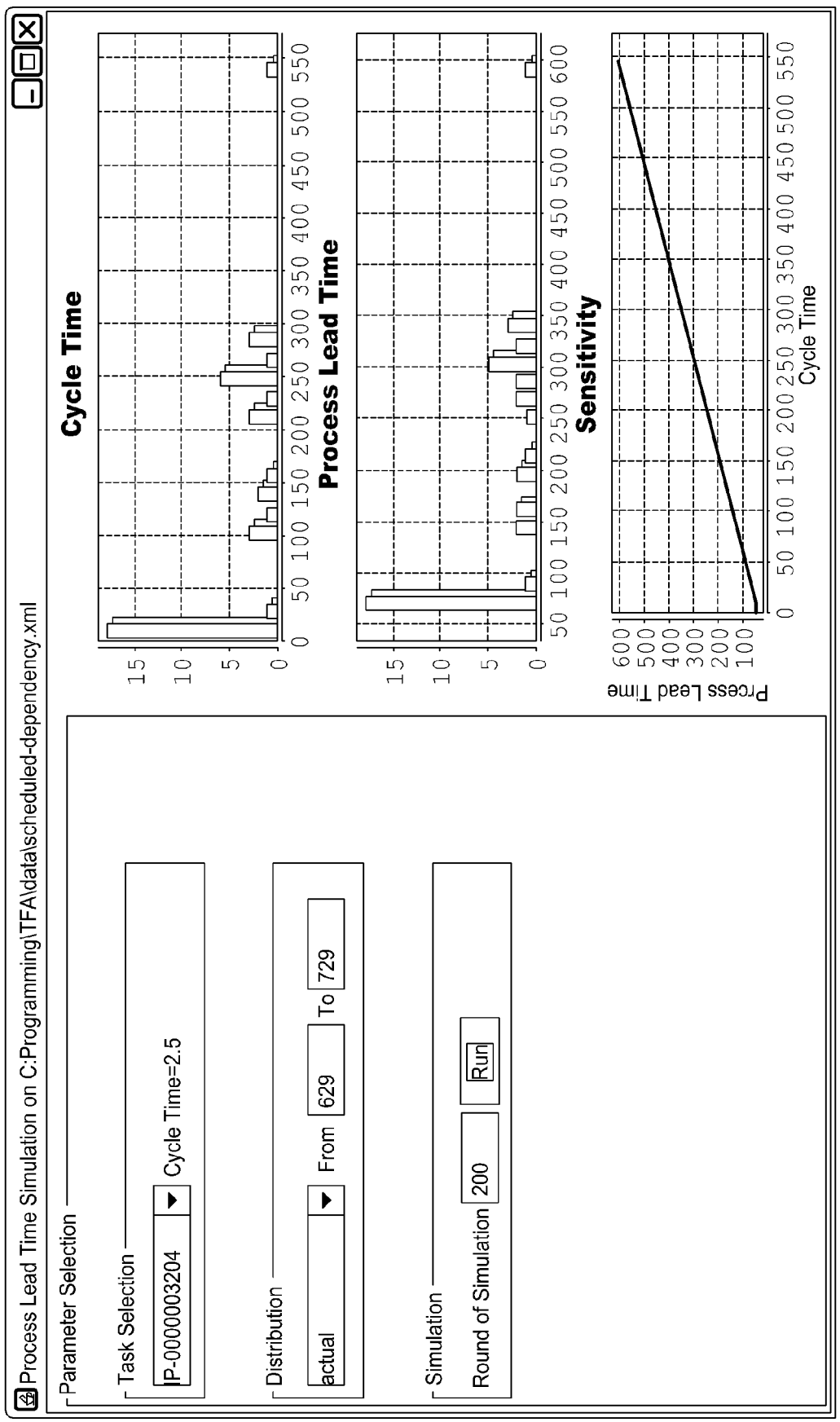

In embodiments, a software component 432, Process Simulation & Prediction, is utilized to investigate impact of task delays on the process lead time. As shown in FIGS. 11A and 11B, a graphical interface allows users to input the delay distribution. For each run of simulation, based upon the specified parameters, random variables are generated, from which the CPM will automatically calculate the overall process lead time. The outcome of simulation can be used to analyze what-if scenarios. The prediction results can be presented in histogram charts and line charts for the users to visually observe the impact.

Critical Path Method (CPM) typically uses total slack to identify the critical path of a precedence network. Total slack is the time between a task's latest finish time (lft) and its earliest start time (est) minus the task's cycle time: (t): slack=lft−est−t. Slack is the longest delay that a task can take without delaying the whole process schedule.

In embodiments, any task having a total slack equal to, for example, "0" is a critical task and therefore is on the critical path of the precedence network. In large-scale processes involving complex tasks, such as airplane assembly, delay for a few minutes usually will not affect the overall process completion schedule. Thus, the slack threshold can be relaxed according to the nature of domain application. We relaxed the threshold value to five minutes, but users can define this value depending on their domain needs.

FIG. 10 shows a dependency graph and highlight of its critical path obtained from the dependency discovery algorithms and critical path analysis method described above.

In a large-scale process that consists of thousands of tasks, it is important to account for the delays and resolve the root causes. For example, consider an end-to-end assembly line that contains more than 7000 discrete tasks, each of which has a scheduled start time, a scheduled end time, and a scheduled cycle time. The actual execution time often deviates from the scheduled time due to process irregularities caused by unexpected (or expected) floor events. The historic delay can be important information for pinpointing systematic problems frequently encountered in complex manufacturing processes.

The Job Delay Distribution Analysis Component 422 calculates the delay statistics from historical performance data provided by Task Flow Analyzer Server 418. Statistics (e.g., minimum, maximum, average, and variance) are computed for three kinds of task delay: start delay, end delay, and cycle delay. In addition a total delay may also be computed as sum of the three delays.

FIG. 12 shows an exemplary screen shot of a query result of task delays. The delay statistics are computed by the embodiment 422 from the historical data provided by the embodiment 418. Note that some table cells have a negative value for the delay, which means that the corresponding tasks are started or finished ahead of the original schedule.

Another issue of dynamic process management is to address out-of-sequence tasks. These are the tasks that deviated from the scheduled plan. These out-of-sequence tasks may cause downstream delay. The discovery of the out-of-sequence tasks can provide a set of possible root causes for the process delay.

Detecting out-of-sequence tasks requires the precedence networks that are built upon data from scheduled and actual execution time. For example, if in a scheduled precedence network, task A precedes task B, but in the actual precedence network, task B precedes task A, then this indicates a conflict of dependency and further indicates task A or B is out of sequence and could potentially cause problems for downstream tasks.

Out-of-sequence tasks are discovered via the Conflict Mining component 428 by comparing the dependency relationships in the scheduled dependence network and the actual dependence network. For example, when the direction of an arc between task A and task B is not consistent in the two networks, the arc is added into the conflict graph. As a result, the conflict graph contains all the possible out-of-sequence tasks.

Figure 13A:
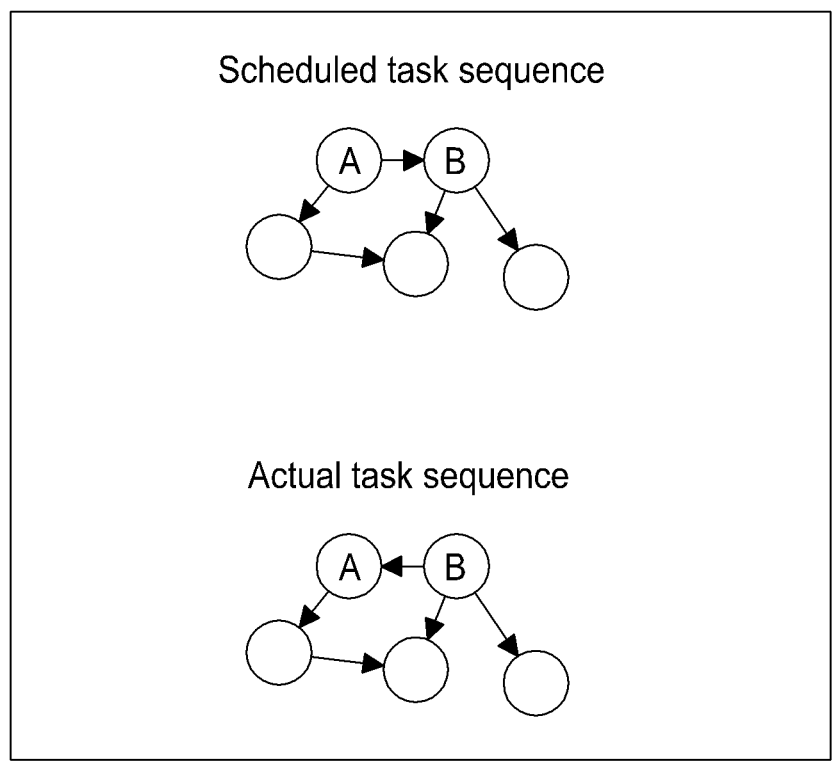
FIG. 13A is an example that shows how a conflict is detected based on the scheduled task dependence network and the actual task dependence network.

FIG. 13A is an example that shows how a conflict is detected based on the scheduled task dependence network and the actual task dependence network. In the example, task A and task B exhibit a conflict.

Figure 13B:
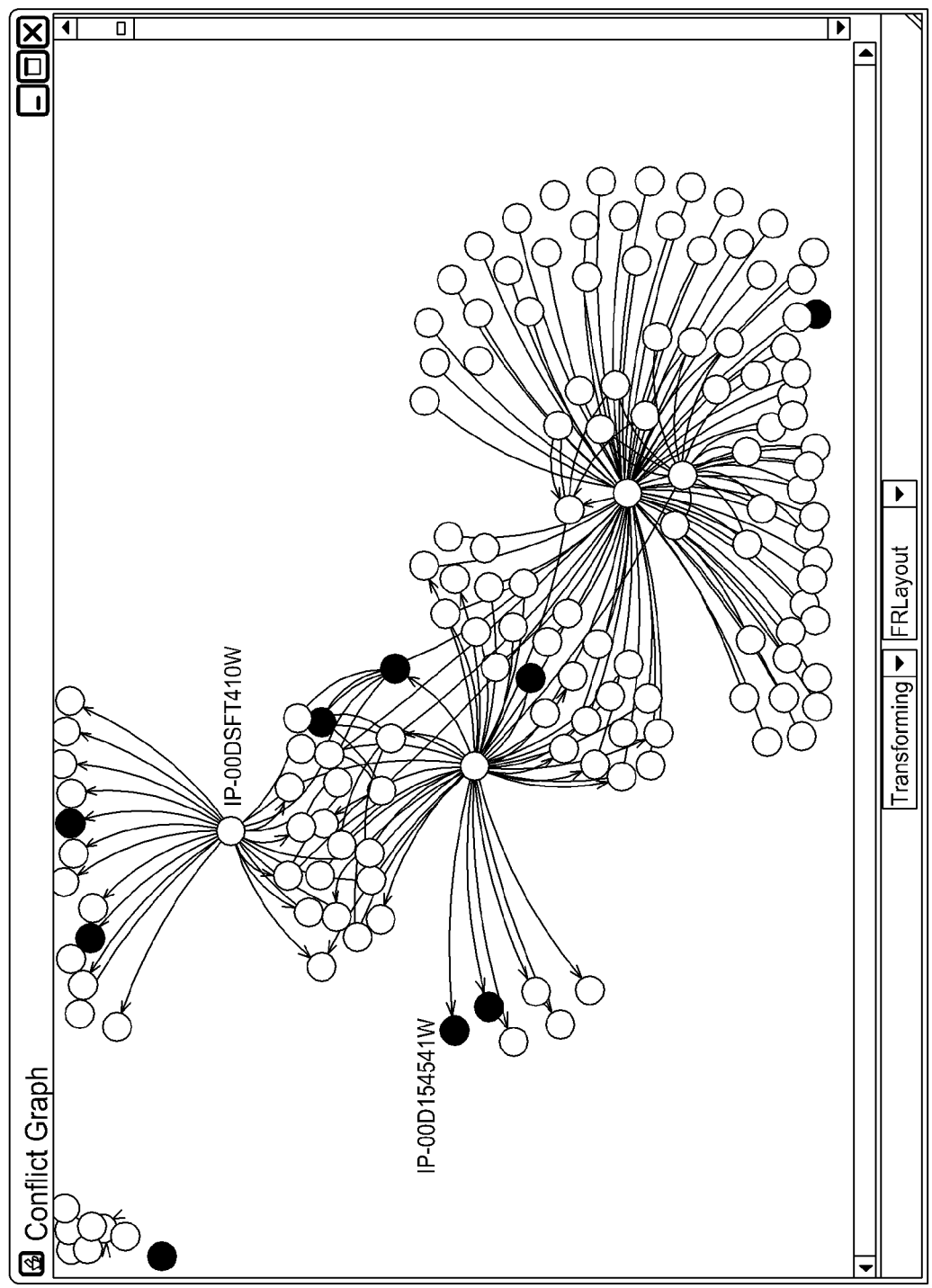
FIG. 13B illustrates a screen shot of a conflict graph for an airplane assembly process.

FIG. 13B illustrates a conflict graph. In the conflict graph, some nodes have multiple inbound and outbound arcs while others have only a single arc. Densely connected nodes are the hubs of other nodes connected to it. They are likely a source of conflict and are declared as out-of-sequence tasks. For example, the task IP-00DSFT410W (task 1302) is out-of-sequence, but IP-00D154541W (task 3104) is not.

Not all of the conflict nodes are root causes for the process delay. A guiding principle of root cause identification is to determine candidate tasks (nodes) along a critical path, as shown in FIG. 10, that has a history of large delay and variance. This approach is a hybrid one that utilizes both delay information mined from historical data and the knowledge obtained from KPDT.

In one embodiment, Root Cause Discovery component 426 can be described as following. The algorithm first determines the candidate nodes along the critical path. Those critical nodes with large delays and variance are considered as candidates for root causes. The candidates are further filtered by examining the KPDT data. If a corresponding entry is found in the KPDT database, then the candidate are listed as root cause. Otherwise, the candidate is not considered as root cause.

In FIG. 13B, the root cause nodes are highlighted in the conflict graph. As shown, the highlighted nodes cover the most of the root cause nodes. This indicates further evidence of the value of the conflict graph in discovering the root causes of a process delay.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computerized method for retrieving and processing data to provide dependency and root cause information for a process, comprising:

receiving data corresponding to a historic performance of the process;

detecting temporal dependencies and precedence tasks in the process from the historic data, wherein the temporal dependency is a dependency among tasks that are related through time constraint;

generating historic dependency data;

aggregating the historic dependency data into a probabilistic precedence network (PPN), the PPN including a complete set of all possible temporal dependency relationships reflected in the historic data;

pruning the PPN by removing dependencies that occur a minimum number of times based on the historic dependency data, wherein the minimum number of times is a predefined minimum threshold value;

identifying, from tasks that maintained a dependency in the pruned PPN, tasks that have had at least one of a delay or variance above a defined threshold based on the historic data;

determining, from the tasks that have had at least one of a delay or variance above a defined threshold, tasks that have had a failure or a delay from one or more of the following: rework, repair, part shortage, and operator request for parts;

identifying the tasks that have had a failure or a delay from one or more of the following: rework, repair, part shortage, and operator request for parts as a root cause for delay; and presenting results to a user.

2. The method according to claim 1, wherein the temporal dependency or the precedence tasks are represented as a precedence network in the form of directed acyclic graph (DAG).

3. The method according to claim 1, wherein the dependency data includes, for the entire process, all required tasks to manufacture a product.

4. The method according to claim 1, wherein pruning the PPN further comprises filtering out less likely dependencies of the process and keeping robust dependencies of the process.

5. The method according to claim 4, wherein a particular dependency will be kept in the PPN if a probability of the particular dependency exceeds a threshold.

6. The method according to claim 4, wherein the robust dependencies reflect tasks that have mandatory precedence relationships that impact the entire process.

7. A system for retrieving and processing data to provide dependency and root cause information for a process, comprising:

a memory area; and a processor programmed to:

collect data corresponding to a historic performance of the process;

detect temporal dependencies and precedence tasks in the process from the historic data, wherein the temporal dependency is a dependency among tasks that are related through time constraint;

generate historic dependency data;

aggregate the historic dependency data into a probabilistic precedence network (PPN), the PPN including a complete set of all possible temporal dependency relationships reflected in the historic data;

prune the PPN by removing dependencies that occur a minimum number of times based on the historic dependency data, wherein the minimum number of times is a predefined minimum threshold value;

identify, from tasks that maintained a dependency in the pruned PPN, tasks that have had at least one of a delay or variance above a defined threshold based on the historic data;

determine, from the tasks that have had at least one of a delay or variance above a defined threshold, tasks that have had a failure or a delay from one or more of the following: rework, repair, part shortage, and operator request for parts;

identify the tasks that have had a failure or a delay from one or more of the following: rework, repair, part shortage, and operator request for parts as a root cause for delay; and present results to a user.

8. The system according to claim 7, wherein the temporal dependency or the precedence tasks are represented as a precedence network in the form of directed acyclic graph (DAG).

9. The system according to claim 7, wherein the dependency data includes, for the entire process, all required tasks to manufacture a product.

10. The system according to claim 7, wherein pruning the PPN comprises filtering out less likely dependencies of the process and keeping robust dependencies of the process.

11. The system according to claim 10, wherein a particular dependency will be kept in the PPN if a probability of the particular dependency exceeds a threshold.

12. The system according to claim 10, wherein the robust dependencies reflect tasks that have mandatory precedence relationships that impact the entire process.

* * * * *